US006422049B1

(12) United States Patent
Jenks

(10) Patent No.: US 6,422,049 B1
(45) Date of Patent: Jul. 23, 2002

(54) T-HANDLE LOCK ASSEMBLY

(76) Inventor: Bruce Jenks, 772 Newton Way, Costa Mesa, CA (US) 92627

( * ) Notice: Subject to any disclaimer, the term of this patent is extended or adjusted under 35 U.S.C. 154(b) by 0 days.

(21) Appl. No.: 09/784,463

(22) Filed: Feb. 15, 2001

(51) Int. Cl.[7] .............................................. B60R 25/02

(52) U.S. Cl. ........................ 70/208; 70/416; 292/336.3; 292/348

(58) Field of Search .......................... 70/208, 224, 416, 70/417; 292/336.3, 347, 348, 356, 357, 350

(56) References Cited

U.S. PATENT DOCUMENTS 3,089,330 A * 5/1963 Kerr ......................... 70/208 X
3,234,765 A * 2/1966 Kerr ............................ 70/208
4,132,092 A 1/1979 Steinbach
4,552,001 A 11/1985 Roop
4,604,879 A * 8/1986 Neary et al. ............ 292/348 X
4,689,976 A 9/1987 Larsen
4,835,998 A 6/1989 Steinbach
4,899,561 A 2/1990 Myers
4,993,247 A * 2/1991 Minemura .................. 70/208
5,038,588 A 8/1991 Hall
5,212,972 A 5/1993 Kincaid et al.
5,272,894 A * 12/1993 Stillwagon et al. ........... 70/208
5,390,517 A * 2/1995 Yamada .................... 70/224 X
5,586,459 A * 12/1996 Bullock et al. ............... 70/224
5,711,506 A * 1/1998 Stillwgon .................... 70/208
5,813,708 A * 9/1998 Shen .................. 292/336.3 X
5,921,119 A 7/1999 Myers et al.
5,984,383 A * 11/1999 Parikh et al. ............ 70/208 X
6,029,484 A * 2/2000 Jetton ....................... 70/416 X
6,141,998 A * 11/2000 Seo .................... 292/336.3 X

* cited by examiner

*Primary Examiner*—Suzanne Dino Barrett
(74) *Attorney, Agent, or Firm*—Walter A. Hackler

(57) ABSTRACT

A high security T-handle assembly for supporting a lock cylinder, includes an elongate handle having a passageway therethrough for key access to the locked cylinder along with a housing for containing the locked cylinder. The housing includes an opening therein for enabling projection of a locking pin exterior to the housing. First screw threads are formed on a circumference of the housing on one end of the housing and second screw threads are formed on the handle into one side thereof for engaging the first screw threads in order to secure the handle to the housing. At least one set screw is disposed in the handle for engaging the housing for preventing the unscrewing of the handle from the housing.

9 Claims, 1 Drawing Sheet

T-HANDLE LOCK ASSEMBLY

The present invention is generally related to T-handle assemblies and is more particularly directed to a high security T-handle assembly which is resistant to forced entry.

T-handles assemblies are often utilized in vending machines and the like. As a rule, T-handle assemblies contain cylinder locks operable by a key for moving a locking pin to release the T-handle assembly. The release causes the T-handle to protrude from a flush position with a cabinet in order to enable the handle to be turned for entry.

Many T-handle assembles have been designed with cylinder locks such as, for example set forth in U.S. Pat. Nos. 3,089,329, 3,089,300, 3,111,833, 3,122,112, 3,213,654, 3,222,699, 3,234,765, 3,285,043, 3,299,676, 3,302,434, 3,550,512, 4,132,092 and 4,552,001.

Prior art T-handles assemblies have commonly been made utilizing a one piece cast T-handle and housing for the cylinder lock, which despite its unity is subject to defeat by hammering, prying or the like because hardened metal cannot be utilized. Still other prior art T-handle assemblies have utilized separate T-handles and housings which introduces a weak point due to the coupling therebetween.

Accordingly, there is a need for an improved high security T-handle assembly which can utilize a hardened metal handle, but at the same time be securely attached to a housing for a cylinder lock which resist defeat by rupture, prying, drilling or wrenching.

SUMMARY OF THE INVENTION

A high security T-handle assembly in accordance with the present invention for supporting a lock cylinder, generally includes an elongate handle having a passageway therethrough for key access to the lock cylinder, along with a housing for containing the lock cylinder and including an opening therein for enabling projection of a locking pin exterior to the housing.

First screw threads are provided and formed on a circumference of the housing on one end of the housing and second are screw threads are provided and formed in the handle on one side thereof for engaging the first screw threads in order to secure the handle to the housing. This screw engagement provides a maximum security coupling between the handle and the housing, and importantly, enables the handle to be manufactured separately out of hardened metal such as, for example steel or the like.

At least one set screw is disposed in the handle for engaging the housing for preventing unscrewing of the handle from the housing.

In order to further secure the handle onto the housing and prevent unscrewing thereof, at least one hole is provided in the housing for receiving the set screw. Preferably the set screw is of sufficient length to traverse an intersection between the handle and the housing. In order to maximize screw contact between the handle and the housing, the hole is disposed along the screw threads for receiving the set screw.

The non-threaded circumference of the housing abuts the one side of the handle. Preferably the handle passageway is coaxial with the housing and the handle is disposed in a transverse relationship with the housing.

To further enhance a security of the T-lock assembly, the handle includes an opposite side, having a rounded surface to prevent hammer blows thereto from dislodging the handle from the housing.

BRIEF DESCRIPTION OF THE DRAWINGS

The present invention will become more fully understood from the detailed description hereinbelow presented in conjunction with the accompanying drawings which are provided by way of illustration only.

DETAILED DESCRIPTION

Figure 1:
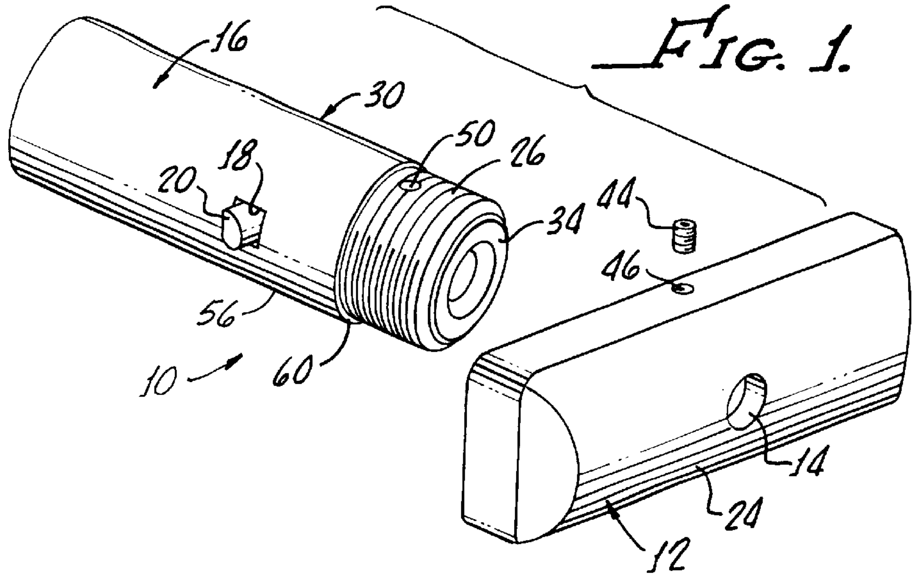
FIG. 1 is an exploded perspective view of a T-handle assembly in accordance with the present invention generally showing a T-handle and a housing for a cylinder lock (not shown)

Which reference to FIG. 1, there is shown a high security T-handle assembly 10 in accordance with the present invention which generally includes an elongate handle 12 having a passageway 14 therethrough for key access to a lock cylinder (not shown) in a housing 16. The housing 16 contains the lock cylinder (not shown) and includes an opening 18 for enabling projection of a locking pin 20 exterior to the housing 16.

Separability of the handle 12 from the housing is important in order to enable one of a hardened tempered metal steel which is resistant to abuse. This must be contrasted with heretofore T-handle assemblies which are unitary and typically cast due to manufacturing costs constraints.

The housing 16 need not be formed from a hardened steel or the like in view of its total containment within a vending machine or the like (not shown). Thus, the only exposure of the T-lock assembly, is the handle 12 itself which preferably includes a rounded surface 24 to prevent hammer blows thereto from dislodging the handle from the housing. That is, the rounded surface 24 prevents a total transference of a hammer blow due to the vectoring of the force applied in multiple directions.

First screw threads 26 are formed on a circumference 30 of the housing 16 on one end 34 of the housing 16.

Second mating screw threads 38 are formed into a side 40 T-handle for engaging the first screw threads 26 in order to secure the handle 12 to the housing 16.

Figure 2:
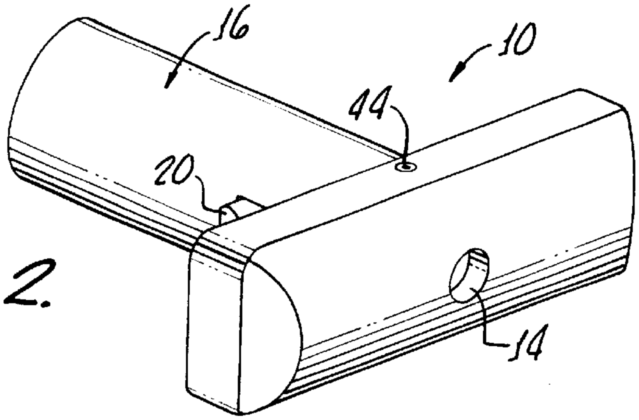
FIG. 2 is a perspective view of the T-handle assembly shown in FIG. 1 in an assembled configuration.
Figure 3:
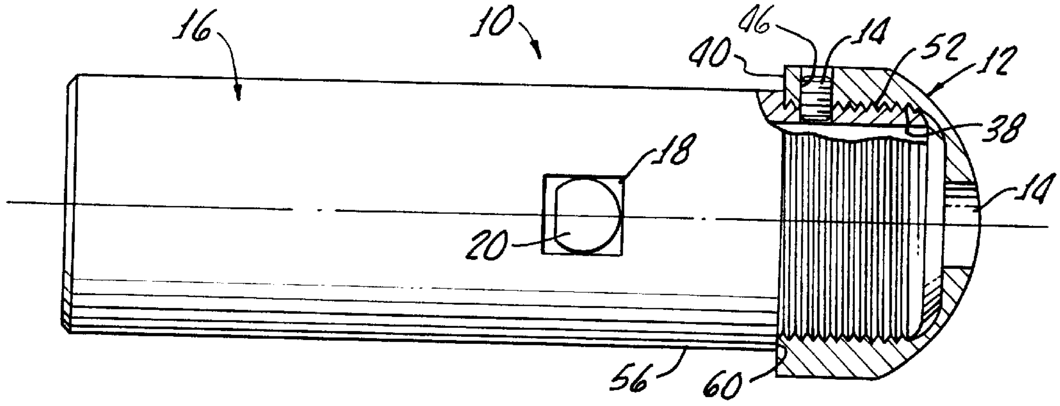
FIG. 3 is across sectional view of the T-handle assembly in accordance with the present invention illustrating the engagement of screw threads between the housing and the handle along with a set screw, which is provided for preventing unscrewing of the handle from the housing.

As shown in FIGS. 1–3, at least one set screw 44, threadably engaging a hole 46 in the handle, is provided for engaging the housing 16 for preventing unscrewing of the handle 12 from the housing 16. In order to further secure the handle from unscrewing from the housing 16, a hole 50 is provided in the housing threads 26 and as shown most clearly in FIG. 3, the set screw 44 is of sufficient length to traverse an intersection 52 between the handle 12 housing 16. Thus, when the set screw is fully deployed into the housing hole 50, unscrewing of the handle 12 from the housing 16 is impossible.

Importantly, a non-threaded portion 56 of the housing 16 includes a shoulder 60 which abuts the handle side 40 in order to prevent prying of the handle 12 from the housing 16.

Although there has hereinabove described a specific embodiment of a T-handle lock in accordance with the present invention, for the purpose of illustrating the manner in which the invention may be used to advantage, it should be appreciated that the invention is not limited thereto. Accordingly, any or all modifications, variations, or equivalent arrangements which may occur to those skilled in the art should be considered within the scope of the present invention as defined in the appended claims.

What is claimed is:

1. A high security T-handle assembly for supporting a lock cylinder, the T-handle assembly comprising:

an elongate handle having a passageway therethrough for key access to the lock cylinder;

a housing for containing the lock cylinder including an opening therein for enabling projection of a locking pin exterior to said housing;

first screw threads formed on a circumference of said housing on one end of said housing;

second screw threads formed in the handle, into one side thereof, for engaging said first screw threads in order to secure the handle to said housing; and at least one set screw, disposed in said handle, for engaging said housing for preventing unscrewing of the handles from said housing.

2. The high security T-handles assembly according to claim 1 further comprising at least one hole in said housing, for receiving the set screw and wherein the set screw is of sufficient length to traverse an intersection between the handle and said housing.

3. The high security T-handles assembly according to claims 2 wherein the housing hole is disposed transverse to the first screw threads.

4. The high security T-handle assembly according to claim 3 wherein the housing hole is disposed along the first screw threads.

5. The high security T-handle assembly according to claim 4 wherein a non-threadable circumference of said housing abuts the one side of the handle.

6. The high security T-handle assembly according to claim 5 wherein the handle passageway is coaxial with said housing.

7. The high security T-handle assembly according to claim 6 wherein the handle is disposed transverse to said housing.

8. The high security T-handle assembly according to claim 7 wherein the handle comprises hardened steel, the use of hardened steel being enabled by the separability between said housing and the handle.

9. The high security T-handle assembly according to claim 8 wherein the handle includes an opposite side having a rounded surface to prevent hammer blows thereto from dislodging the handle from said housing.

* * * * *